United States Patent
Pentz et al.

[11] 3,756,418
[45] Sept. 4, 1973

[54] SKIMMING APPARATUS FOR CLARIFICATION TANK

[75] Inventors: Howard L. Pentz; Chandrakant Parkhani, both of Lansdale; Frank Majeron, Philadelphia, all of Pa.

[73] Assignee: FMC Corporation, San Jose, Calif.

[22] Filed: Jan. 12, 1972

[21] Appl. No.: 217,377

[52] U.S. Cl. .............................. 210/525, 210/527
[51] Int. Cl. ........................................ B01d 21/00
[58] Field of Search ................. 210/525, 522, 527

[56] References Cited
UNITED STATES PATENTS

| | | | |
|---|---|---|---|
| 2,159,409 | 5/1939 | Tark | 210/527 |
| 3,635,349 | 1/1972 | Weiss | 210/527 |
| 2,101,081 | 12/1937 | Lund | 210/527 |
| 3,669,271 | 6/1972 | McGivem | 210/527 |
| 2,670,080 | 2/1954 | Scott | 210/527 |

Primary Examiner—Samih N. Zaharna
Assistant Examiner—T. A. Granger
Attorney—Max Dressler et al.

[57] ABSTRACT

A skimming apparatus for a liquid clarification tank that has an inlet for supplying liquid with suspended matter and an outlet for receiving clarified liquid and in which the outlet consists of longitudinally extending transversely spaced weir boxes that receive clarified liquid. The skimming apparatus is supported on a traveling bridge that is reciprocated between extreme positions along a path parallel to the weir boxes and extends transversely of the path of travel. The skimming apparatus consists of first and second portions that are respectively aligned with the weir boxes and the areas between the weir boxes. The first portions of the skimming apparatus are deflectable from a first position to a second position when the bridge traverses the area of the tank occupied by the weir boxes. The skimming apparatus is pivoted between operative and inoperative positions on the bridge and the first portions consist of elements pivoted to adjacent ends of the second portions that are rigid plates. The elements are biased to a first position and have camming members on the free ends for engaging tapered ends on scum baffles surrounding the weir boxes to move the elements from the first position when the bridge traverses the area of the weir boxes.

9 Claims, 3 Drawing Figures

PATENTED SEP 4 1973 3,756,418

SKIMMING APPARATUS FOR CLARIFICATION TANK

BACKGROUND OF THE INVENTION

The use of rectangular gravity separation tanks has become increasingly popular in recent years. It will be appreciated that for a given rate of influent containing suspended matter to be removed, rectangular tanks require the occupation of much less land than do circular tanks. Furthermore, the use of rectangular tanks greatly simplifies the construction of other portions of a sewage treatment plant. For example, in using rectangular final settling tanks in an activated sludge process, a common wall may be employed between the final settling tank and the aeration tank and, if desired, the activated sludge that is withdrawn from the final settling tank can be returned directly to the aeration tank.

In most instances in the application of rectangular gravity separation tanks, it has been found desirable to provide longitudinally extended weir boxes adjacent the outlet end of the tank with the weir boxes extending a considerable distance from the end of the tank towards the center thereof. In addition, a plurality of transversely spaced weir boxes are normally utilized to provide extra box length and support for the longitudinally extended weir boxes. These weir boxes extend perpendicular to the direction of travel of the solids or sludge removal means.

In arrangements of this type, one of the problems that has been encountered is the removal of scum or other floating matter that reaches the surface of the liquid in the area of the box system. When using longitudinally extending weir boxes that are located within the body of liquid, it is not possible to utilize the conventional type of skimming apparatus that heretofore has been used in connection with rectangular tanks to remove scum or other floating matter that reaches the surface of the liquid in the area of this box system.

In the rectangular tanks where long weir boxes extend well back into the tank from the outlet end thereof, it has been proposed to utilize either a water jet or an air jet action to carry the scum and other floating materials to a scum receiving trough located adjacent the outlet end of the tank. However, it will be appreciated that such a solution is not completely satisfactory since either the water jet or air jet disturbs the quiescent state of the liquid in the tank.

Thus, there remains a need for a simple and effective apparatus that can be utilized for skimming the liquid surface along the entire length of a tank that has weir boxes extending from the outlet end.

SUMMARY OF THE INVENTION

The present invention comtemplates a skimming apparatus that is supported on a bridge reciprocable along a path generally parallel to a plurality of longitudinally extending transversely spaced weir boxes that are located adjacent the outlet end of a rectangular tank. The skimming apparatus consists of a plurality of first and second aligned portions that extend between opposed side walls of the tank and are respectively aligned with the weir boxes and the areas between the weir boxes. The first portions of the skimming apparatus are capable of being deflected from a first position when the traveling bridge traverses the area of the weir boxes. The arrangement has the advantage that the approximately entire surface of the liquid can be covered by the skimming apparatus while the bridge traverses the area between the opposite ends of the tank.

In its preferred form, the skimming apparatus is pivoted about a fixed horizontal axis on the bridge and is movable between operative and inoperative positions to be capable of skimming in one direction and be raised above the surface of the liquid as the bridge is traveling in the opposite direction.

The specific skimming apparatus disclosed consists of a plurality of spaced plates that are secured to a shaft supported for rotation about a fixed axis on the traveling bridge. The adjacent ends of the plates are spaced from each other by a dimension that is substantially equal to the transverse dimension of each of the weir boxes. First and second elements are respectively carried on the adjacent ends of two plates and are normally held in a first position spanning the area between the adjacent plates. The elements are capable of being deflected from the first position to a second position to accommodate movement of the plates between the weir boxes.

More specifically, the elements consist of first and second members, respectively pivoted about fixed axes on the respective ends of the plates and spring biasing means normally holding the members in a first position. The members additionally have camming means that cooperate with scum baffles that surround each of the weir boxes so that the members can be biased from the first position and will automatically be moved from the first position when the bridge traverses the area of the weirs. The scum baffles provide a structure which extends above and below the upper edge of the sidewalls of the weir boxes, and clarified liquid flows under the lower edge of the baffle structures and into the weir boxes over the upper edge thereof for discharge exteriorly of said tank.

In one specific embodiment, the elements extend towards the adjacent weir boxes and define V-shaped members between adjacent ends of the two plates. In an alternate embodiment, the first position for the elements locate the elements substantially parallel to the respective rigid plates and the elements are held in such position by springs. The elements can then be cammed to a second position located rearwardly of the path of travel for the bridge as the skimming means traverses the box area. It is also desirable to have automatic moving means for pivoting the skimming apparatus from its operative to the inoperative position when the direction of bridge travel is reversed. This is accomplished by a drive means supported on the bridge with limit switches defining the respective positions for the skimming apparatus. The drive means is automatically actuated at the end of the bridge travel and is rendered inoperative when either of the limit switches are operated.

BRIEF DESCRIPTION OF SEVERAL VIEWS OF DRAWINGS

DETAILED DESCRIPTION

Figure 1:
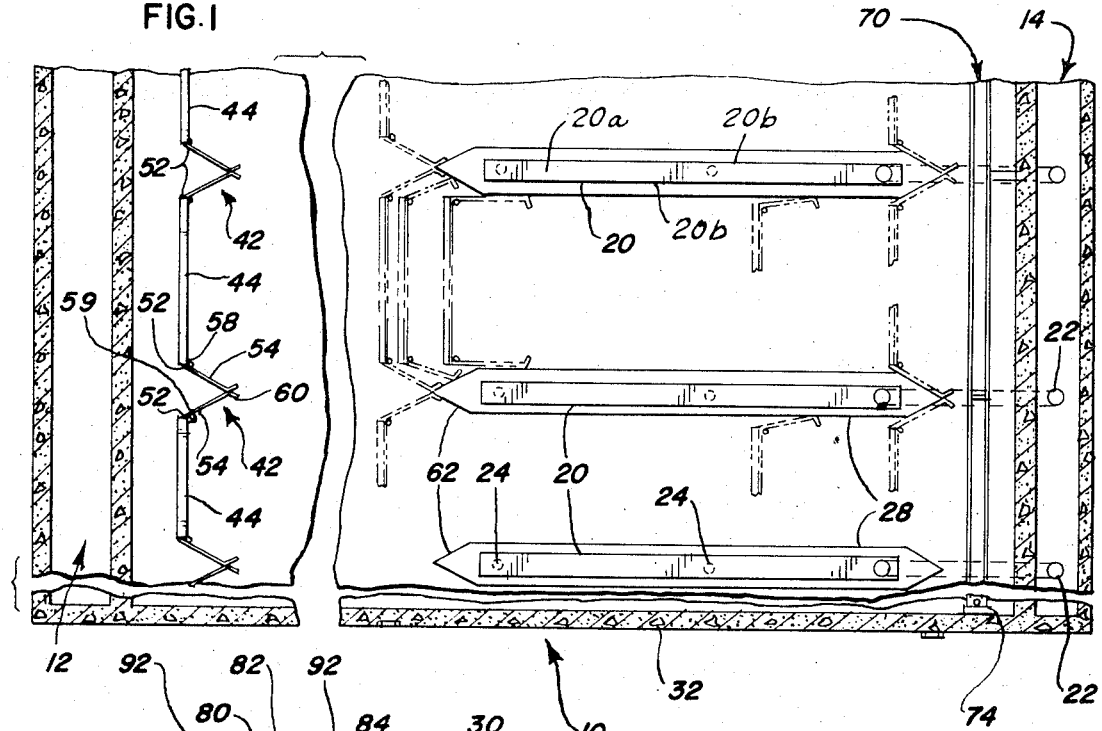
FIG. 1 is a fragmentary horizontal section showing a rectangular tank having the present invention incorporated therein.

While this invention is susceptible of embodiment in many different forms, there is shown in the drawings and will herein be described in detail several embodiments, with the understanding that the present disclosure is to be considered as an exemplification of the principles of the invention and is not intended to limit the invention to the embodiments illustrated.

Figure 2:
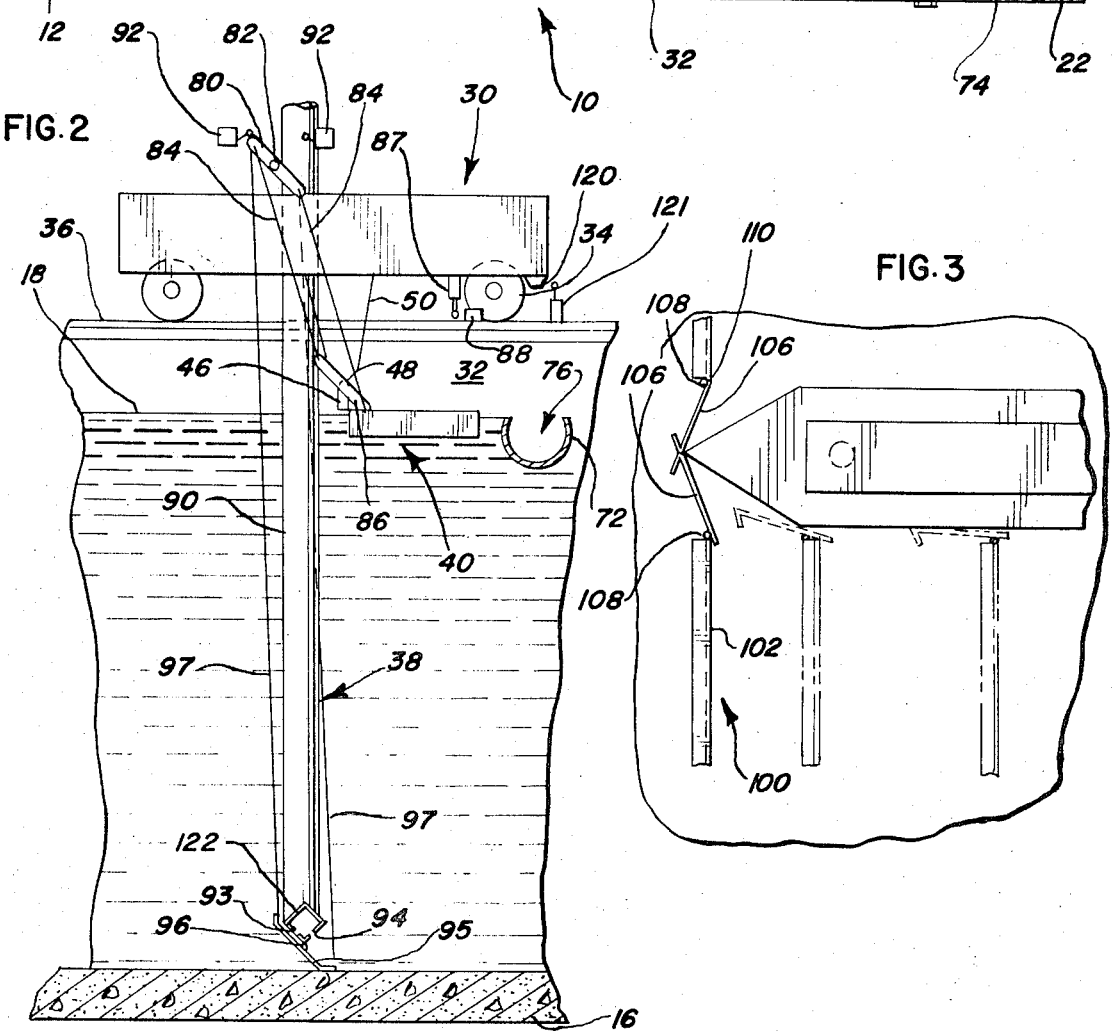
FIG. 2 is an enlarged fragmentary vertical section showing the traveling bridge.

FIGS. 1 and 2 of the drawings show a liquid clarification tank 10 that is illustrated as being substantially rectangular and has an influent or inlet end 12 for delivering mixed liquor to the tank. The mixed liquor, consisting of liquid having entrained or suspended solids therein flows towards the outlet or effluent end 14 of the tank during which time the solids are either settled to the floor or bottom 16 of the tank or, when having a specific gravity less than water, will float on the upper surface 18 of the liquid in the tank.

As indicated above, in many instances, it becomes necessary to collect portions of the clarified liquid at a location other than the extreme outlet end of the tank. One manner of accomplishing the above is to provide a plurality of elongated weir boxes 20 that extend parallel to each other and are transversely spaced from each other. In the illustrated embodiment, one end of each of the elongated weir boxes 20 is spaced from the outlet end 14 of the tank and communicates therewith through a conduit 22 that extends from the box downwardly under the scum removing means 70 and into the outlet end 14. The weir boxes 20 include a bottom wall 20a and upwardly extending sidewalls 20b, and. In addition, each of the outlet or effluent weir boxes is supported on posts or pedestals 24 so that the upper edges of the sidewalls respective weirs are in horizontal alignment and define the upper surface level 18 of the liquid in the tank. To prevent floating solids or other materials from entering the weir boxes, vertically arranged, scum baffles 28 surround each of the weir boxes and extend above and below the liquid level. The lower edge of each baffle 28 is spaced above the bottom of the tank, so that liquid can flow under the lower edge of the baffles and into the weir boxes.

In rectangular tanks such as the type described above, the solids that are separated from the liquid as the liquid flows between the inlet and outlet ends and settle to the tank bottom are removed from the liquid by reciprocating a traveling bridge 30 along the tank and withdrawing or otherwise removing the settled solids from the bottom of the tank while floating solids or suspended matter are removed from the surface of the liquid by skimming apparatus.

In the illustrated embodiment, the traveling bridge 30 is supported on the upper end of the side walls 32 through driven wheels 34 guided on tracks 36 and is reciprocated between the inlet and outlet ends 12 and 14. The bridge supports sludge or solids removing means 38 for removing settled solids from the bottom of the tank and skimming means 40 for removing floating solids from the surface 18 of the liquid in the tank.

Heretofore, when utilizing a skimming blade for removing solids or scum from the surface of the liquid in a tank having longitudinally extending weir boxes, it was necessary to raise the skimming blade while the bridge was traversing the area of the tank occupied by the weir boxes. Such an arrangement is highly undesirable since many of the floating solids or other liquid contaminants on the water have a tendency to flow towards the outlet end of the tank.

According to the present invention, the skimming apparatus 40 is capable of traversing approximately the entire length of the tank and removing floating solids or scum from any area of the surface of the liquid irrespective of weir box length. The apparatus is inexpensive to construct and has a limited number of components while still being capable of efficiently and effectively removing materials from the entire length of the tank.

The skimming apparatus or means 40 consists of a plurality of first portions or plates 42 and a plurality of second portions 44 that extend transversely of the tank for removing scum from the surface of the liquid. The first and second portions are respectively longitudinally aligned with the weir boxes and the areas between the weir boxes and the first portions are deflectable from a first position when the bridge traverses the area of the tank occupied by the weir boxes. Also, the first and second portions cover the entire area between opposite side walls 32 of the tank and have upper and lower edges respectively located above and below the level of the liquid in the tank defined by the upper edges of the weir boxes when the skimming blade is in the skimming position shown in FIG. 2.

More specifically, the skimming means consists of a plurality of plates or angle irons that define the second portions 44. The angle irons have a plurality of brackets 46 secured thereto and fixed to a shaft 48 that is supported for rotation about a fixed axis on brackets 50 that are carried by the bridge. The adjacent ends 52 of the respective plates are spaced from each other by a dimension that is substantially equal to the transverse spacing between adjacent sides of the two adjacent baffles 28 that surround the respective weir boxes 20. Thus, the plates or skimming blades 44 can move between adjacent weir boxes and have their upper and lower edges respectively located above and below the liquid level to remove substantially all of the floating material supported adjacent the surface 18 of the liquid in the area between the weirs.

Each first portion 42 consists of first and second elements 54 respectively supported on the adjacent ends 52 of the blades or plates 44. In the embodiment illustrated in FIGS. 1 and 2, the elements 54 cooperate to define a V-shaped member between adjacent ends of the respective plates 44 with the base of the V-shaped member extending towards the weir boxes 20. The V-shaped member spans the area between the adjacent ends 52 of the respective plates 44. In addition, the elements 54 are substantially rigid and planar throughout their length and are pivoted on the adjacent ends of the plate through pivot pins 58. The elements are normally held in a first position by springs 59.

The second portions or elements 54 further include camming means 60 that cooperate with the ends 62 of the scum baffles, which are tapered to a point so that the elements are automatically moved from a first position to a second position where they extend substantially parallel to the path of travel of the bridge and also parallel to the weirs when the skimming apparatus traverses the weir area. Again, for purposes of illustration, the camming means consist of outwardly turned free ends on the respective elements that engage the respective surfaces of the tapered ends 62 to automatically move from the first position shown in solid line FIG. 1 in progressive increments to the dotted line positions shown in FIG. 1. When the bridge approaches the opposite ends of the wier boxes, more particularly, the scum baffles 28, the bias of the springs 59 will automatically move the free ends of the elements 54 into engagement with each other to again span the entire area across the tank.

The skimming means further include conventional scum and solids removing means 70 in the form of a tube 72 that extends axially between the opposed side walls 32 and is supported for rotation in brackets 74 (only one being shown). The upper portion of the tube is removed to define a scum receiving opening 76 (FIG. 2) and the tube is designed to be rotated on its axis to receive the scum as the skimming means approaches the outlet end 14 of the tank. and to dispense scum from the tank through the open end of the tube.

Preferably, the skimming apparatus is movable from an operative to an inoperative position when the bridge reaches the outlet end of the tank and movable from an inoperative to an operative position when the bridge reaches the inlet end of the tank. In the illustrated embodiment, this is accomplished by means for pivoting the skimming means about the axis defined by the shaft 48. The pivoting means consists of one or more links 80 having intermediate portions secured to a shaft 82 that is supported for rotation about a fixed axis on the bridge 30. The link 80 is connected through a pair of cables 84 to a second link 86 that is secured intermediate its ends to the shaft 48 supporting the second portions 44 of the skimming means. The shaft 82 is adapted to be rotated in either direction by a suitable reversible motor (not shown) which is actuated by a limit switch 87 carried by the bridge. The limit switch is actuated by a pair of cams 88 (one being shown) located on the respective ends of the tank. The limit switch not only controls the pivoting of the skimming means 40 but also automatically reverses the direction of travel of the bridge.

The rotational movement of the scum receiving tube 72 to an operative position is controlled by a cam 120 which is attached to the bridge and limit switch 121 fixed to wall 32. The return of the scum receiving tube to an inoperative position is controlled by an adjustable time clock (not shown) that is energized by limit switch 121.

Thus, as the bridge approaches one end of the tank, the limit switch 121 is actuated by the cam 120 to rotate the tube 72 counterclockwise to a position for receiving scum and other floating solids from the skimming means or apparatus 40. When the plates 44 have moved all of the material adjacent their leading edges to the scum receiving means 70, limit switch 87 is actuated by cam 88 to energize the motor cooperating with shaft 82 to pivot the skimming means 40 from the first operative position shown to a second inoperative position substantially 90° from the first position where the plate 44 and elements 54 are spaced from the surface 18 of the liquid, while the scum and solids removal means 70 is returned to the position shown in FIG. 2, by the aforementioned adjustable time clock, not shown. When the skimming means reaches that position, the motor cooperating with shaft 82 is rendered inoperative by a limit switch 92. A second limit switch 92 performs the same function adjacent the inlet end of the tank to control the limits of movement of the skimming means from its inoperative to its operative position as the bridge travel and motor for rotating shaft 82 are reversed by the limit switch 87 and a further cam 88.

As can be appreciated, from the above description, approximately the entire area 18 of the liquid is skimmed by the skimming means 40 and the device is designed to automatically accommodate the weir boxes 20 and the scum baffles surrounding the weir boxes. In addition, any scum or solid material that engages the first portions 42 is automatically moved towards the plates 44 because of the V-shaped configuration of the first portions 42. This is beneficial since all of the floating materials will be positively carried towards the scum receiving means 70 by the plates 44.

While numerous types of solid removal means 38 can be utilized for removing settled solids from the tank bottom, a preferred type has been shown and will be described. The solids or sludge removal means 38 consists of an inverted T-shaped tube having a vertical portion 90 depending from the bridge 30 and a horizontal portion 122 extending across the bottom of the tank perpendicular to the direction of travel of the bridge. The horizontal portion 122 has first and second sets of openings 93 and 94 respectively directed toward the inlet and outlet ends of the tank. A solids deflecting plate 95 is pivoted intermediate its ends about a fixed pivot axis 96 below the horizontal portion 122.

The deflecting plate is pivotable between first and second positions by cables 97 that are connected to opposite ends of the links 80. In each of the two positions, the deflecting plate directs solids to one set of openings while sealing the other set of openings. It should be noted that the reversal of the deflecting plate occurs simultaneous to movement of the skimming means between two positions as well as reversal of bridge travel.

One inverted T-shaped tube is carried by the bridge for movement between each pair of adjacent weirs. The solids may be withdrawn through individual pumps or air lifts cooperating with each tube and directed through individual conduits to an aeration tank. Alternatively, the upper ends of the tubes could be received in a trough supported on the bridge and the flow of solids controlled through the hydrostatic head differential.

Figure 3:
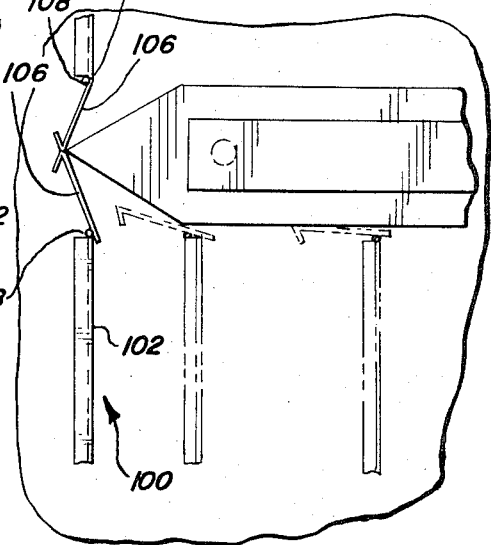
FIG. 3 is an enlarged fragmentary plan view of a slightly modified form of skimming means.

A slightly modified form of the invention is shown in FIG. 3 where a skimming means 100 consists of plates 102 identical in construction to plates 44 and elements 106 that are biased to a first position extending substantially parallel to a plane defined by the plates 102. Again, the elements or rigid plates 106 are pivoted about fixed pivot axes 108 on the respective adjacent ends of the plates 102 and are biased to a first position by springs 110 that normally hold the plates in positions substantially parallel to the respective plates 102. In this form of skimming means, the elements 106 are moved to a second position that is located rearwardly of the path of travel of the skimming apparatus in each direction of travel of the bridge as the bridge traverses the box area.

In both embodiments of the invention, the scum receiving trough has been shown at the outlet end of the tank. However, it will be appreciated that the trough could readily be located at the inlet end of the tank.

While the skimming means has been described in connection with a gravity separation tank in which solids having specific gravity both greater and less than the liquid that are separated, the skimming means has equal applicability in gravity separation where all of the solids or particulate matter have a specific gravity less than the liquid, such as separating oil from water.

In addition, the trough or scum receiving means could be moved manually rather than by the motorized apparatus described above.

We claim:

1. Liquid clarification apparatus comprising: a longitudinal tank having an inlet for supplying liquid having entrained solids and outlet means for discharging clarified liquid from said tank, said outlet means including a plurality of longitudinally extending weir boxes spaced apart from one another transversely across the width of said tank, each of said weir boxes including a bottom wall and upwardly extending sidewalls, said outlet means further including conduit means communicating between the interior of said weir boxes and the exterior of said tank; vertically arranged baffle structure surrounding each weir box with an upper edge thereof above the level of the upper edge of the sidewall of its associated weir box and with the lower edge thereof above the bottom of the tank; bridge means supported on said tank and positioned above said weir boxes and baffle structures, said bridge means being arranged for reciprocating travel back and forth along the length of the tank; drive means for reciprocating said bridge means; skimming means carried by said bridge means and including a plurality of skimming blades having an upper portion located above the level of the upper edge of the sidewalls of the weir boxes and a lower portion located below the level of the upper edge of the sidewalls of the weir boxes, whereby said skimming blades transport scum longitudinally of said tank when said bridge means is reciprocated toward said weir boxes, said skimming blades including a deflectable first portion aligned with a weir box and a second portion aligned with the transverse spaces between the baffle structures and the baffle structure and the sidewall of the tank, connection means between said deflectable first portions and the second portions to permit each skimming blade deflectable first portion to be deflected relative to the second portion of the skimming blade by engagement with the baffle structure when the skimming means in travelling toward one end of said tank engages a baffle structure; and means for receiving scum from said skimming means and for discharging scum externally of said tank.

2. Liquid clarification apparatus as defined in claim 1, in which said second portions include rigid plates extending along said bridge means with adjacent ends of said plates spaced from each other, and in which said first portions each include first and second elements respectively carried by the adjacent ends of adjacent plates and means normally maintaining said elements in a first position to span the area between said adjacent ends.

3. Liquid clarification apparatus as defined in claim 2, in which said baffle structures each have at least one end tapering to a point; and camming means on free ends of said elements for engaging the tapered ends and moving said elements from said first position when said bridge traverses the area of said weir boxes.

4. Liquid clarification apparatus as defined in claim 3, in which said elements cooperate to define a V-shaped member between adjacent ends of said plates with the base of said V-shaped member longitudinally aligned along said weir boxes.

5. Liquid clarification apparatus as defined in claim 2, in which said elements are rigid and are pivoted on the adjacent ends of said plates.

6. Liquid clarification apparatus as defined in claim 5, further including biasing means normally maintaining said rigid elements in said first position and accommodating movement from said first position.

7. Liquid clarification apparatus as defined in claim 2, further including means for pivoting said skimming means on said bridge means between operative and inoperative positions.

8. Liquid clarification apparatus as defined in claim 2, in which said first and second portions are located in a substantially common plane extending perpendicular to the path of travel of said bridge means when said elements are in said first position.

9. Liquid clarification apparatus as defined in claim 1, in which said skimming means is supported for pivotal movement between operative and inoperative positions on said bridge means and further including solids removal means carried by the bridge means and having a deflecting plate pivoted between first and second positions adjacent the bottom of said tank; and means for simultaneously moving said skimming means and said deflecting plate between said positions.

* * * * *

UNITED STATES PATENT OFFICE
CERTIFICATE OF CORRECTION

Patent No. 3,756,418                     Dated September 4, 1973

Inventor(s) Howard L. Pentz; Chandrakant Parkhani and Frank Majeron

It is certified that error appears in the above-identified patent and that said Letters Patent are hereby corrected as shown below:

Column 1, line 25, after "extra" insert --weir--.

Column 1, line 32, insert --weir-- after "the" (2nd occurrence).

Column 1, line 38, after "this" insert --weir--.

Column 2, line 32, cancel "weirs" and insert in its place --weir boxes--.

Column 2, line 48, after "the" insert --weir--.

Column 3, line 29, after "the" insert --weir--.

Column 3, line 33, "and. In" should be --and in--.

Column 5, line 2, "wier" should be --weir--.

Column 5, line 15, delete the period after tank.

Column 6, line 58, after "the" insert --weir--.

Signed and sealed this 25th day of December 1973.

(SEAL)
Attest:

EDWARD M. FLETCHER, JR.          RENE D. TEGTMEYER
Attesting Officer                Acting Commissioner of Patents